United States Patent
Sekino et al.

(10) Patent No.: US 8,841,551 B2
(45) Date of Patent: Sep. 23, 2014

(54) SLIDING DEVICE FOR A CABLE MANAGEMENT DEVICE

(75) Inventors: Tsukasa Sekino, Shizuoka (JP); Tomoyasu Terada, Shizuoka (JP); Shinji Katou, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 13/138,187

(22) PCT Filed: Jan. 19, 2010

(86) PCT No.: PCT/JP2010/050521
§ 371 (c)(1),
(2), (4) Date: Jul. 18, 2011

(87) PCT Pub. No.: WO2010/095483
PCT Pub. Date: Aug. 26, 2010

(65) Prior Publication Data
US 2011/0290522 A1    Dec. 1, 2011

(30) Foreign Application Priority Data

Feb. 17, 2009 (JP) ................. 2009-034356
Feb. 17, 2009 (JP) ................. 2009-034357

(51) Int. Cl.
| | | |
|---|---|---|
| H02G 3/04 | (2006.01) | |
| H02G 11/00 | (2006.01) | |
| B60R 16/027 | (2006.01) | |
| B60R 16/02 | (2006.01) | |
| B60N 2/07 | (2006.01) | |
| B60N 2/02 | (2006.01) | |

(52) U.S. Cl.
CPC ............. *H02G 11/00* (2013.01); *H02G 3/0468* (2013.01); *B60R 16/027* (2013.01); *B60R 16/0215* (2013.01); *B60N 2002/0264* (2013.01); *B60N 2/0715* (2013.01)
USPC ...... 174/68.3; 174/72 C; 174/72 R; 174/88 R

(58) Field of Classification Search
CPC ........................... B69N 2/0715; B69N 2/0725
USPC ... 174/68.1, 68.3, 70 C, 72 C, 72 R, 88 R, 95
See application file for complete search history.

(56) References Cited

U.S. PATENT DOCUMENTS 6,820,851 B2 * 11/2004 Mochizuki et al. ............ 248/429
7,814,637 B2 * 10/2010 Terada ............................ 29/434

(Continued)

FOREIGN PATENT DOCUMENTS

EP 1725788 A1 11/2006
EP 2360062 A1 8/2011

(Continued)

OTHER PUBLICATIONS

International Search Report dated Feb. 16, 2010, issued for PCT/JP2010/050521.

(Continued)

*Primary Examiner* — Anatoly Vortman
*Assistant Examiner* — Jacob Crum
(74) *Attorney, Agent, or Firm* — Edwards Wildman Palmer LLP

(57) ABSTRACT

An object of the present invention is to provide a compact sliding device having a simple structure configured to reduce the number of cut lines formed on a mat mounted on a cabin of a vehicle.

A sliding device 1 for routing an electric wire 5 between a vehicle floor and a seat includes: a rail 9 having a supporting rail 7 to which a supporting body 11 of the seat is attached, and a receiving part 8 extended along the supporting rail 7; a corrugate tube 4 receiving the electric wire 5; a slider 10 configured to slide in conjunction with the supporting body 11 while holding the corrugate tube 4 extracted into an inside of the supporting rail 7; and a guiding member 12 for bending the corrugate tube 4 extracted out of the supporting rail 7 in a U-shape, and guiding the corrugate tube 4 into an inside of the receiving part 8, and for guiding the corrugate tube 4 onto an inner side wall 81 of the receiving part 8 away from the supporting rail 7. The corrugate tube 4 is further bent in a U-shape in the receiving part 8, and a folded back part of the corrugate tube 4 abuts on an inner side wall 82 of the receiving part 8 near the supporting wall 7 owing to an elastic restoring force of the corrugate tube 4.

9 Claims, 10 Drawing Sheets

(56) References Cited

U.S. PATENT DOCUMENTS

2006/0060370 A1 3/2006 Goto et al.
2007/0044989 A1 3/2007 Nishijima et al.

FOREIGN PATENT DOCUMENTS

| JP | 2003-312385 A | 11/2003 |
|---|---|---|
| JP | 2004-210103 A | 7/2004 |
| JP | 2006-035961 A | 2/2006 |
| JP | 2008-220150 A | 9/2008 |
| JP | 2008245392 A | 10/2008 |

OTHER PUBLICATIONS

The extended European search report dated Apr. 14, 2014 issued for corresponding European Patent Application No. 10743612.3.

* cited by examiner

SLIDING DEVICE FOR A CABLE MANAGEMENT DEVICE

TECHNICAL FIELD

This invention relates to a sliding device for routing an electric wire between a vehicle body such as a floor of a car, and a sliding body such as a seat slidably arranged relative to the vehicle body.

BACKGROUND

A seat as a sliding body may be slidably arranged relative to such as a floor of a cabin as a vehicle body. An electronic device such as a seating sensor for detecting whether a crew is seated or not is mounted on the seat. For this reason, various sliding devices are used to route an electric wire between the floor and the seat for connecting the electronic device attached to the seat with the electronic device fixed to the floor (for example, see Patent Document 1).

As shown in FIGS. 11 and 12, a sliding device 201 described in the Patent Document 1 routes an electric wire 250 between a floor of cabin of a vehicle body and a seat 203 as a sliding body slidably mounted on the floor along an arrow K2. This sliding device 201 includes: a case 205 arranged parallel to a support rail 220 to which a support body 221 for supporting a seat 203 is slidably attached; a rail 211 mounted on an inside of the case 205; a slider 206 sliding on the rail 211 in conjunction with the seat 203; a corrugate tube 204 receiving the electric wire 250; a protector 230; and a pair of malls 207a, 207b. The support rail 220 is disposed under a mat of the cabin.

The case 205 has a tubular shape made of a thick metal plate, and is composed of a lower case 209 and an upper case 210 overlapped with each other. This case 205 is disposed under the mat of the cabin. A regulating part 212 is formed in the case 205 by embossing the lower case 209 toward the upper case 210. This regulating part 212 partitions a space in the case 205 into a first space 205a where the rail 211 is provided, and a second space 205b away from the rail 211, and regulates a route of the corrugate tube 204, namely, electric wire 250 in the case 205 into a U-shape. In the first space 205a, the slider 206 holding an end of the corrugate tube 204 slides on the rail 211 along the arrow K2. The second space 205b receives an extra length of the corrugate tube 204, namely, electric wire 250. In such a sliding device 201, the regulating part 212 prevents the one end and the other end of the corrugate tube 204 moving in the case 205 from scraping each other, so that a movement of the corrugate tube 204 becomes smooth.

A slit 225 extended along the arrow K2 for guiding an upper part of the slider 206 to an outside of the case 205 is formed on the case 205. The upper part of the slider 206 guiding out of the case 205 through the slit 225 is projected toward the cabin via a cut line formed on the mat. The upper part of the slider 206 leads the electric wire 250 guided out from one end of the corrugate tube 204 to the seat 203 arranged at the cabin.

Because the case 205 often gets run over by a crew of a vehicle, the rigidity of the case 205 is improved by thickening a thickness of the case 205, or by arranging concave portions 243 and convex portions 242 alternately along the arrow K2 on a ceiling wall of the upper case 210 for preventing the case 205 from being deformed or damaged when the case 205 gets run over.

The protector 230 is attached to the slider 206 with a string. The protector 230 includes: a flange attached to the seat 203; and a wire holder for holding the electric wire 250 routed to the seat 203 via an inside of the slider 206.

The pair of malls 207a, 207b is attached to the case 205 for preventing a foreign particle from entering the case 205 via the slit 225. Reference numeral 208 in FIG. 12 indicates a bracket for attaching one mall 207a.

PRIOR ART DOCUMENT

Patent Document

Patent Document 1: JP, A, 2006-35961

DISCLOSURE OF THE INVENTION

Problem to be solved by the invention

However, in a vehicle using such a conventional sliding device 201, a cut line on the mat for projecting the upper part of the slider 206 toward the cabin is necessary other than the cut line for projecting the support body 221 toward the cabin. Therefore, there is a problem that many cut lines are needed on the mat. Further, it is necessary to provide the regulating part 212, the concave parts 243 and the convex parts 242 for increasing the rigidity on the case 205. Therefore, there is a problem that the case 205 becomes larger, and has a complex structure. Further, when another part is attached as the regulating part 212 instead of embossing the lower case 209, there is a problem that the number of components of the case 205 is increased.

Further, in the conventional sliding device 201, the rail 211 for slidably attaching the slider 206 should be provided in the case 205. Therefore, there is a problem that the case has a complex structure.

Accordingly, an object of the present invention is to provide a compact sliding device having a simple structure configured to reduce the number of cut lines formed on a mat mounted on a cabin of a vehicle.

Means for Solving the Problem

For attaining the object, according to the invention described in claim 1, there is provided a sliding device for routing an electric wire between a vehicle body and a sliding body supported by a supporting body slidably attached to a long tubular supporting rail fixed to the vehicle body, said sliding device comprising:

a tubular receiving part extended along a longitudinal direction of the supporting rail and parallel to the supporting rail, and fixed to the vehicle body for receiving an extra length of the electric wire;

a tube made of an elastically deformable material for receiving the electric wire;

a holding part configured to slide in conjunction with the supporting body while holding the tube drawn into an inside of the supporting rail from one end of the supporting rail; and a guiding member on which a guiding part is provided for bending the tube extracted out of the supporting rail from one end of the supporting rail in a U-shape, and guiding the tube into an inside at one end of the receiving part, and for guiding the tube onto an inner side wall of the receiving part away from the supporting rail, wherein the tube is further bent in a U-shape in the receiving part, and a folded back part of the tube abuts on an inner side wall of the receiving part near the supporting wall owing to an elastic restoring force of the tube.

According to the invention described in claim 2, there is provided the sliding device as claimed in claim 1, wherein an extracting part is provided on the guiding member for intersecting the electric wire extracted from the tube which is further folded back in the receiving part at a different height from the guiding part to extract the electric wire from the receiving part.

According to the invention described in claim 3, there is provided the sliding device as claimed in claim 1 or 2, wherein the supporting rail and the receiving part are separated from each other.

According to the invention described in claim 4, there is provided the sliding device as claimed in any one of claims 1 to 3, wherein the holding part includes: a supporting-body-attaching part attached to the supporting body; a wire attaching part to which the tube extracted to an inside of the supporting rail from one end of the supporting rail is attached; and a main body configured to extract the electric wire extracted from the tube via the slit provided between one end to the other end of the supporting rail to an outside of the supporting rail and to guide the electric wire to the sliding body.

According to the invention described in claim 5, there is provided the sliding device as claimed in any one of claims 1 to 4, wherein the holding part is attached to the supporting body in a manner that the holding part does not contact the supporting rail.

Effects of the Invention

According to the invention claimed in claim 1, the sliding device includes: a tubular receiving part extended along a longitudinal direction of the supporting rail and parallel to the supporting rail, and fixed to the vehicle body for receiving an extra length of the electric wire; a tube made of an elastically deformable material for receiving the electric wire; a holding part configured to slide in conjunction with the supporting body while holding the tube drawn into an inside of the supporting rail from one end of the supporting rail; and a guiding member on which a guiding part is provided for bending the tube extracted out of the supporting rail from one end of the supporting rail in a U-shape, and guiding the tube into an inside at one end of the receiving part, and for guiding the tube onto an inner side wall of the receiving part away from the supporting rail, and the tube is further bent in a U-shape in the receiving part, and a folded back part of the tube abuts on an inner side wall of the receiving part near the supporting wall owing to an elastic restoring force. Therefore, the tube is prevented from scraping when guiding in or out from the receiving part even without providing a conventional guiding member such as a regulating part or a pulley in the receiving part, and the tube is moved smoothly. Further, when the sliding device is disposed under a mat mounted on a cabin of a vehicle, the electric wire can be inserted into a cut line formed on the mat for projecting the supporting body toward the cabin. Therefore, the number of the cut lines formed on the mat mounted on a cabin of a vehicle can be reduced, and a compact sliding device having a simple structure can be provided.

According to the invention claimed in claim 2, an extracting part is provided on the guiding member for intersecting the electric wire extracted from the tube which is further folded back in the receiving part at a different height from the guiding part to extract the electric wire from the receiving part. Therefore, when the tube is guided in or out from the receiving part, crossing parts of the tube or the electric wire is prevented from scraping each other.

According to the invention claimed in claim 3, the supporting rail and the receiving part are separated from each other. Therefore, the strength of the rail is increased, and it becomes unnecessary to provide the concave portions and the convex portions on the supporting rail and the receiving part. Therefore, the shapes of the supporting rail and the receiving part can be simplified.

According to the invention claimed in claim 4, the holding part includes: a supporting-body-attaching part attached to the supporting body; a wire attaching part to which the tube extracted to an inside of the supporting rail from one end of the supporting rail is attached; and a main body configured to extract the electric wire extracted from the tube via the slit provided between one end to the other end of the supporting rail to an outside of the supporting rail and to guide the electric wire to the sliding body. Therefore, it is unnecessary to provide a rail specifically for attaching the holding part slidably.

According to the invention claimed in claim 5, the holding part is attached to the supporting body in a manner that the holding part does not contact the supporting rail. Therefore, the holding part and the supporting rail are prevented from scraping each other, and the supporting body and the holding part are moved smoothly.

PREFERRED EMBODIMENT

Hereinafter, a sliding device according to an embodiment of the present invention will be explained with reference to FIGS. 1 to 10.

Figure 1:
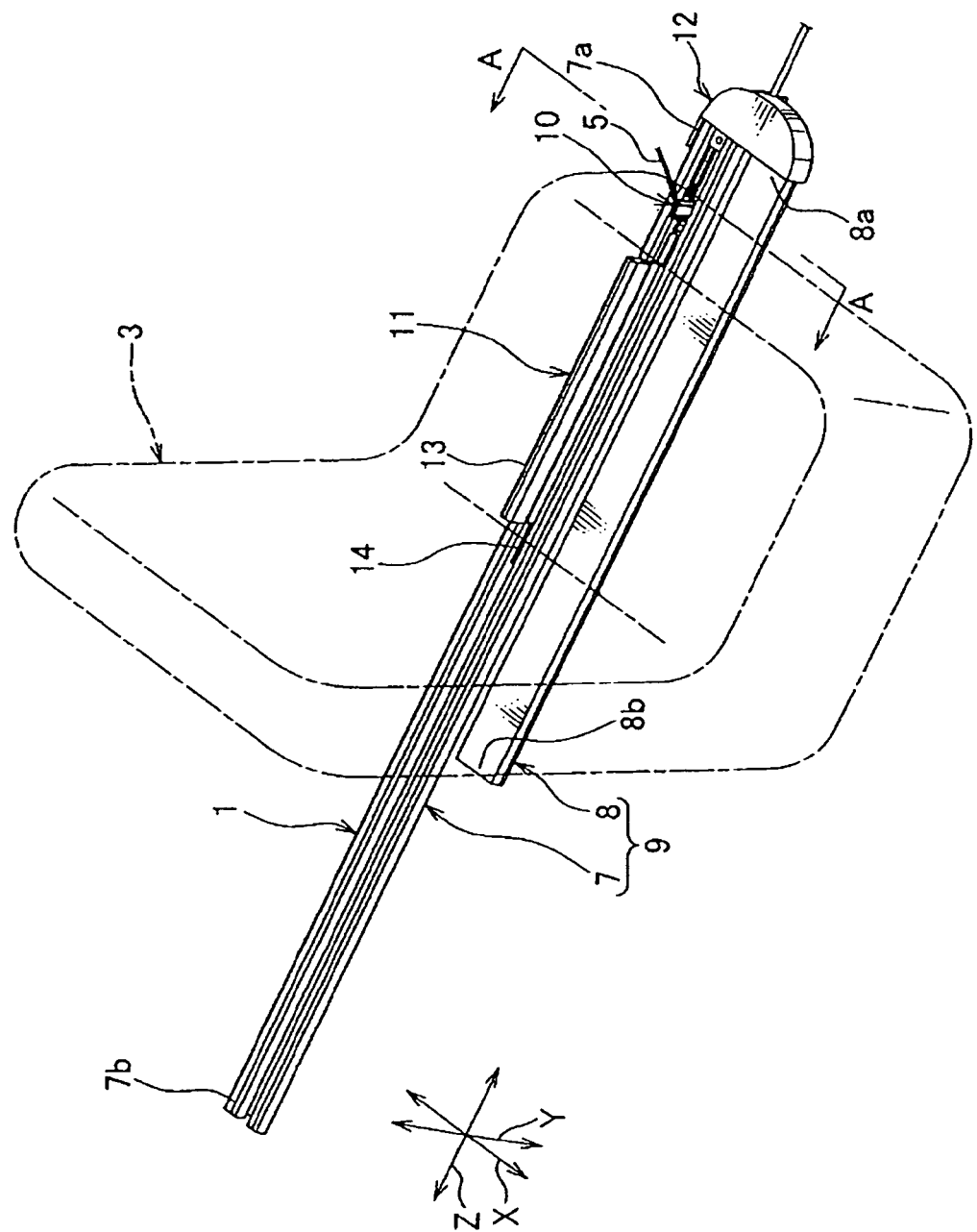
[FIG. 1] A perspective view showing a sliding device according to an embodiment of the present invention.
Figure 9:
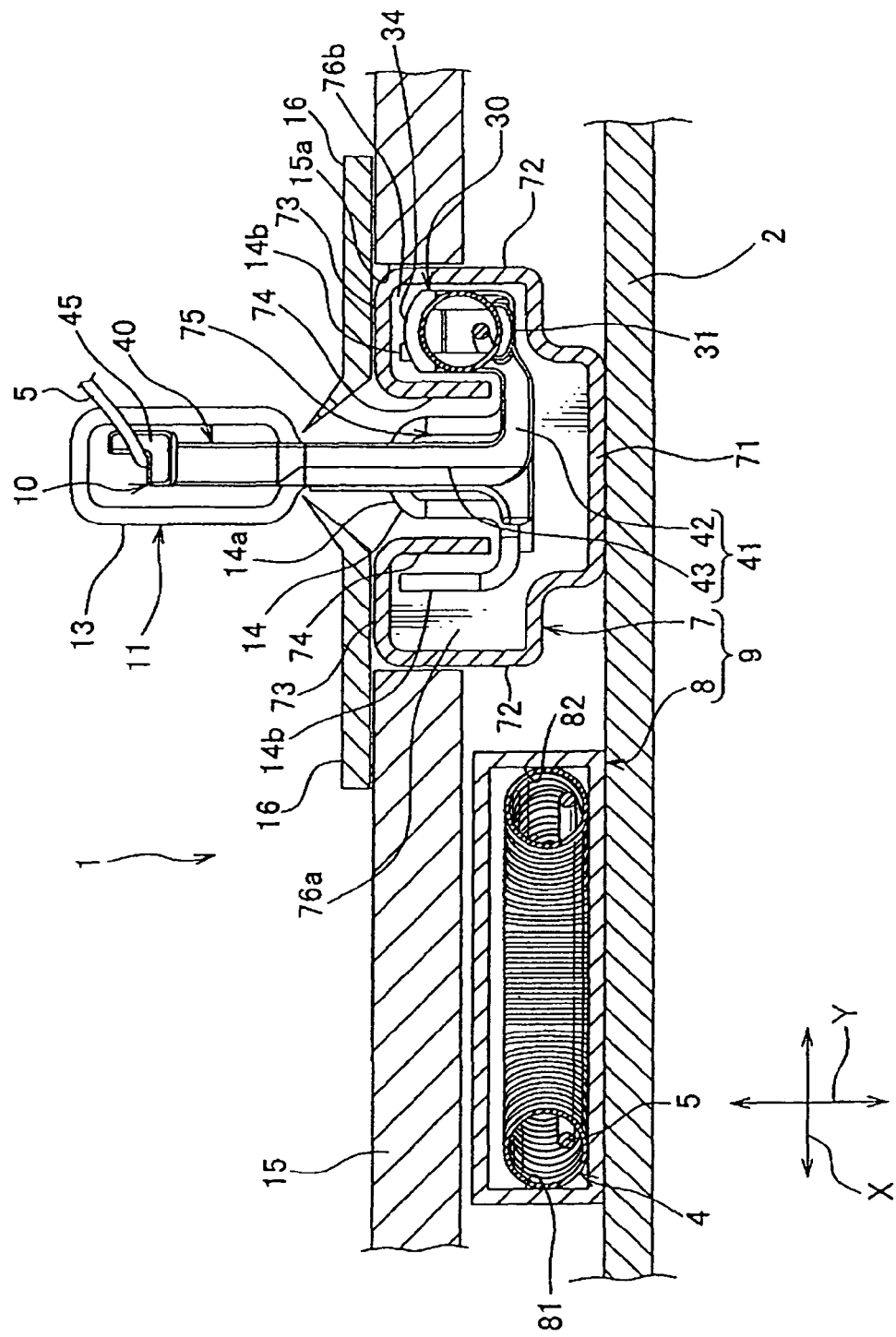
[FIG. 9] A sectional view taken on line A-A of FIG. 1.
Figure 10:
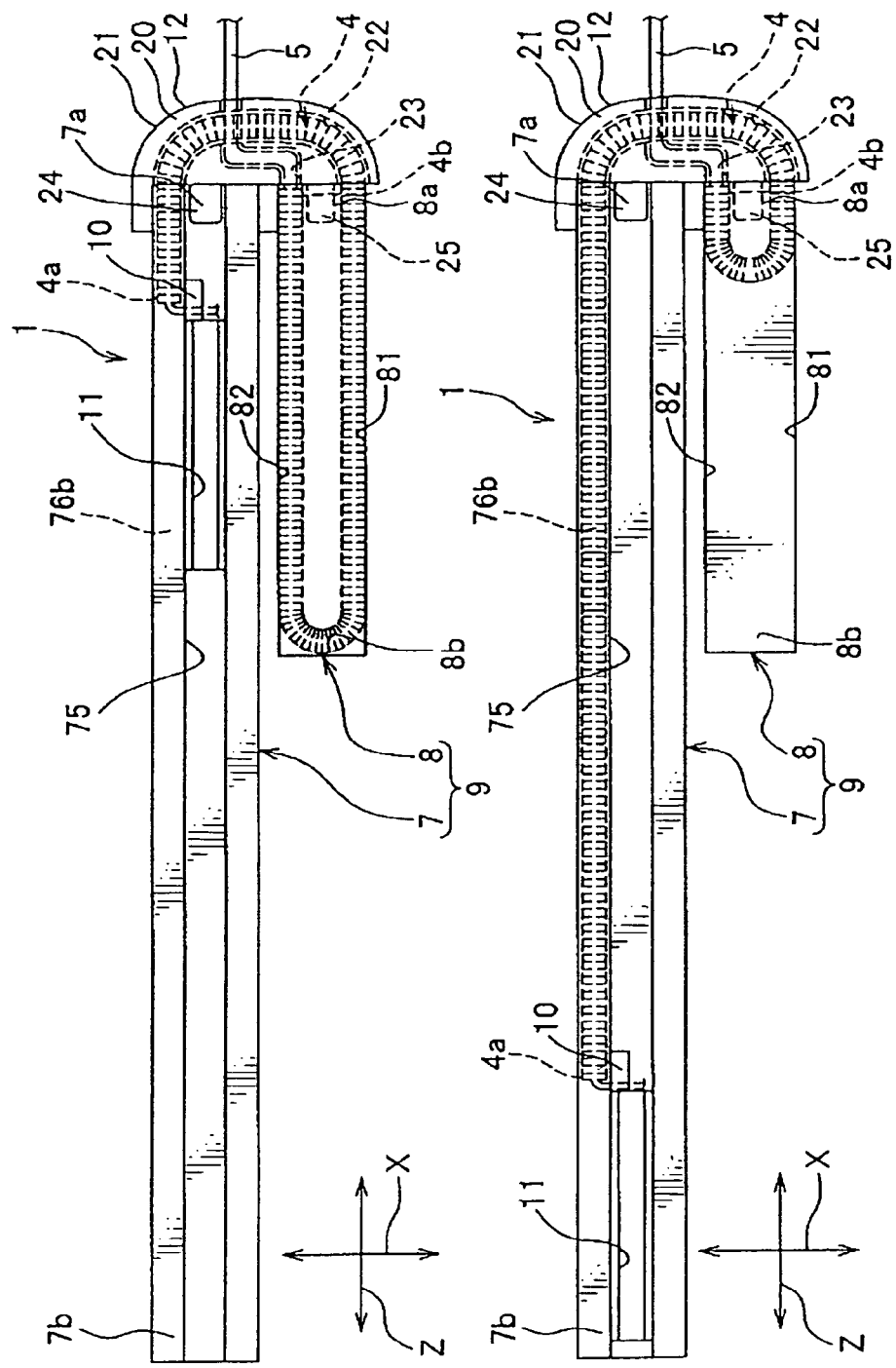
[FIG. 10] An explanatory view for explaining an operation of the sliding device shown in FIG. 1. (a) A view showing that the supporting body is positioned at one end of a supporting rail. (b) A view showing that the supporting body is positioned at the other end of the supporting rail.

As shown in FIGS. 1 and 9, a sliding device 1 routes an electric wire 5 between a floor 2 of a cabin as a vehicle body and a seat 3 as a sliding body slidably provided on the floor 2 along an arrow Z. A mat 15 is laid on the floor 2 (see FIG. 9). The arrow Z in FIGS. 1 to 10 is parallel to a front-back direction of a vehicle. An arrow X is parallel to a width direction of a vehicle. An arrow Y is parallel to an up-down direction of a vehicle.

Electronic devices such as a seating sensor for detecting whether a crew is seated or not, a seat belt sensor for detecting whether a seated crew fasten a seat belt or not, or the like are mounted on the seat 3.

The electric wire 5 is a well-known covered electric wire, and connects the electronic devices mounted on the seat 3 and the electronic devices such as ECU (Electronic Control Unit) mounted on the floor 2, namely, the vehicle body.

The sliding device 1 includes: a rail 9 disposed under the mat 15 and fixed to the floor 2; a corrugate tube 4 as a tube receiving the electric wire 5; a slider 10 as a holding part configured to slide in the rail 9 in conjunction with a supporting body 11 supporting the seat 3 while holding one end 4*a* of the corrugate tube 4; a guiding member 12 attached to one end of the rail 9; and a pair of malls 16 (only shown in FIG. 9).

The rail 9 includes: a tubular supporting rail 7 to which the supporting body 11 supporting the seat 3 is slidably attached; and a tubular receiving part 8 extended along a longitudinal direction of the supporting rail 7 and parallel to the supporting rail 7 for receiving an extra length of the corrugate tube 4, namely, the electric wire 5 folded back in a U-shape. The supporting rail 7 and the receiving part 8 are separated from each other.

Figure 5:
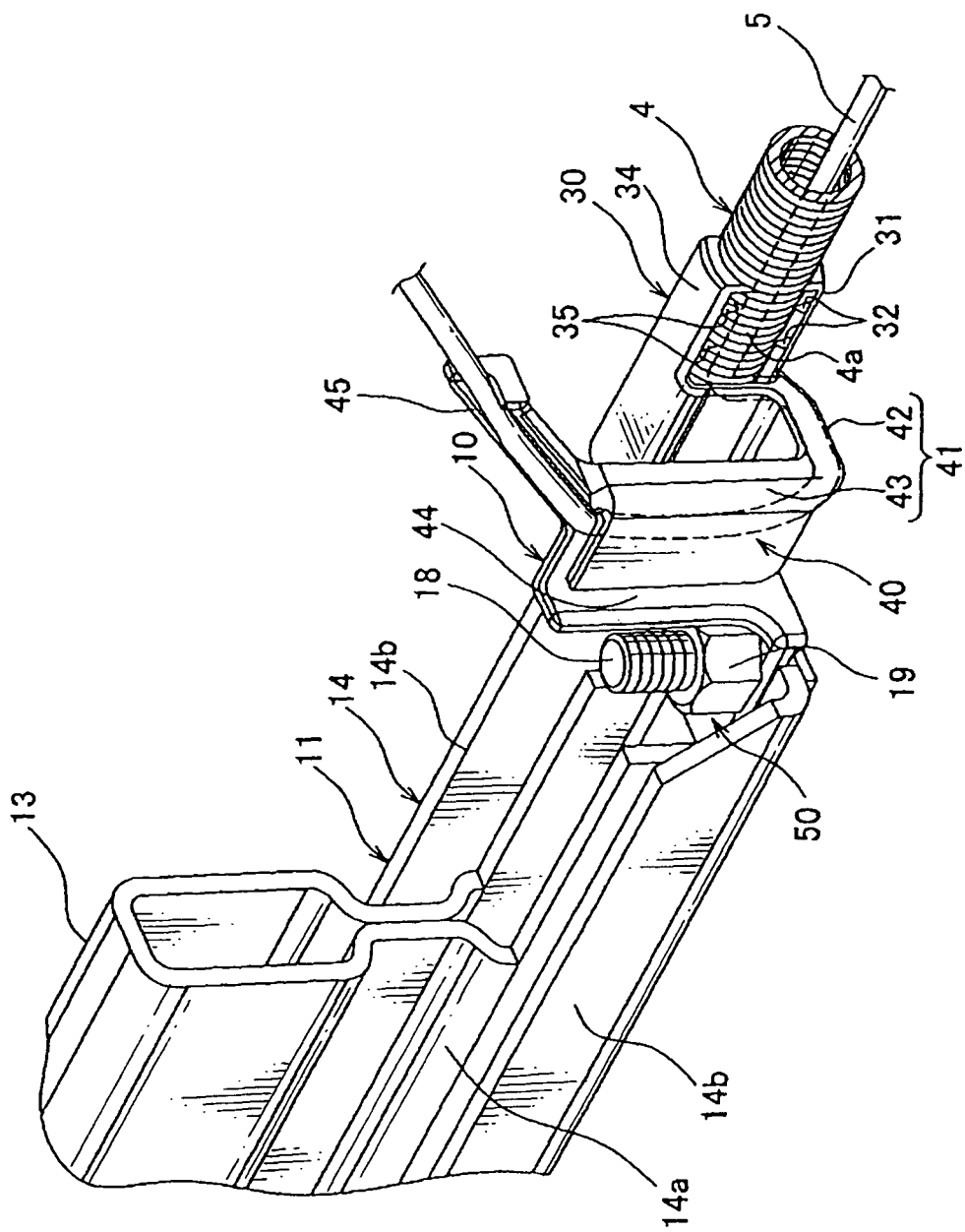
[FIG. 5] A perspective view showing a supporting body and a slider composing the sliding device shown in FIG. 1.
Figure 6:
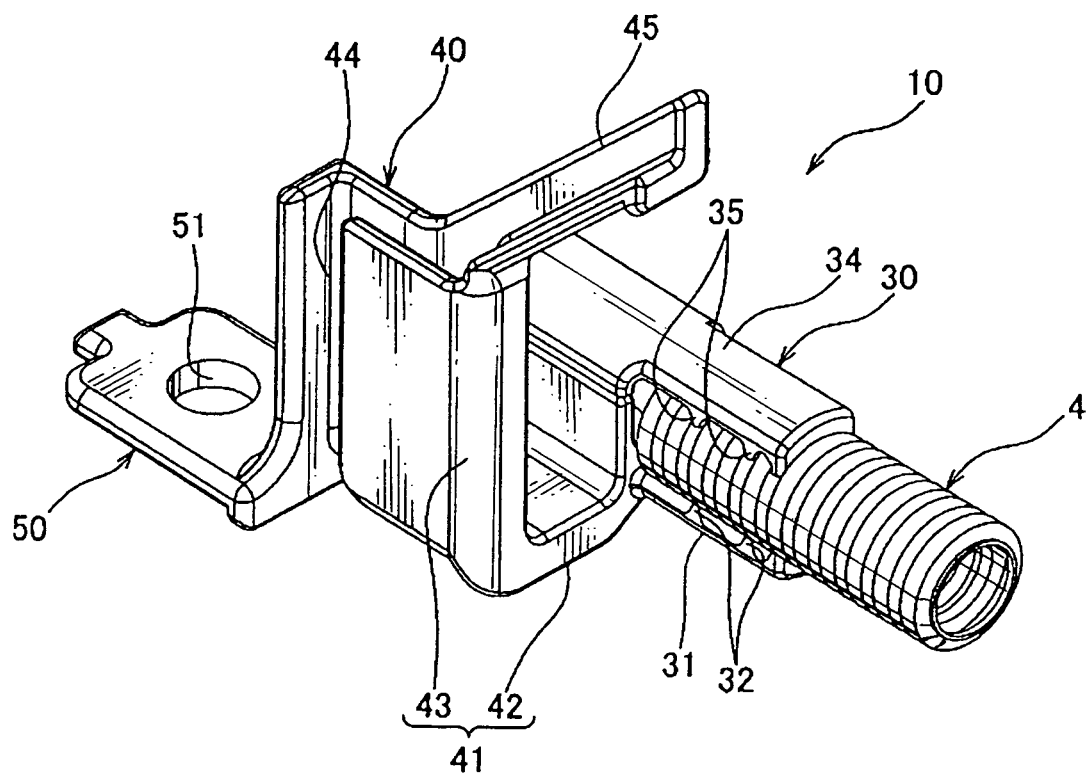
[FIG. 6] A perspective view showing the slider shown in FIG. 5.

As shown in FIGS. 1, 5, and 9, the supporting body 11 includes: a seat attachment part 13 for being attached to the seat 3; and a sliding part 14 disposed in an inside of the supporting rail 7 for sliding in the supporting rail 7.

The supporting rail 7 is made by, for example, folding a metal plate, and as shown in FIG. 9, includes: a bottom wall 71 overlapped with the floor 2; a pair of side walls 72 extended from both ends in a width direction (arrow X direction) of the bottom wall 71; a pair of upper walls 73 extended from upper ends of both side walls 72 to a direction approaching each other and facing the bottom wall 71; and a pair of inner walls 74 extended from ends of the upper walls 73 away from the side walls 72 toward the bottom wall 71. Further, the pair of inner walls 74 are arranged with a gap and separated from the bottom wall 71. Therefore, a slit 75 opening toward a vehicle cabin, namely, the seat 3 is formed between the pair of inner walls 74. Further, the slit 75 is provided between one end 7*a* of the supporting rail 7 in the longitudinal direction (arrow Z direction) and the other end 7*b* of the supporting rail 7. Further, as shown in FIG. 1, the supporting rail 7 is formed in a rail shape, namely, a tubular shape having a same cross-sectional shape in between one end 7*a* in the longitudinal direction (arrow Z direction) and the other end 7*b*.

Further, the sliding part 14 of the supporting body 11 includes: a center part 14*a* positioned in between the pair of inner walls 74, namely, the slit 75; and a pair of extended parts 14*b* continued to the center part 14*a* and extended in a direction away from each other (arrow X direction). The pair of extended parts is respectively positioned in a pair of spaces 76*a*, 76*b* away from each other, and surrounded by the bottom wall 71, the side walls 72, the upper walls 73, and the inner walls 74 of the supporting rail 7. Further, the seat attachment part 13 is disposed over the center part 14*a*, namely, outside of the supporting rail 7, and projected toward the cabin via a cut line formed on the mat 15 (only shown in FIG. 9).

The pair of spaces 76*a*, 76*b* is formed in between the one end 7*a* in the longitudinal direction of the supporting rail 7 and the other end 7*b*. Further, the pair of spaces 76*a*, 76*b* and the slit 75 are displaced relative to each other along the width direction (arrow X direction) of the supporting rail 7.

According to the present invention, because the pair of spaces 76*a*, 76*b* and the slit 75 are displaced relative to each other the width direction of the supporting rail 7, a foreign particle invading the supporting rail 7 via the slit 75 is prevented from interrupting the movement of the supporting body 11 by sticking in any one of the pair of spaces 76*a*, 76*b*.

Further, the one space 76*b* which is further away from the receiving part 8 than the other space 76*a* receives the corrugate tube 4 extracted out from one end 8*a* in the longitudinal direction (arrow Z direction) of the receiving part 8 and extracted in from one end 7*a* of the supporting rail 7, and a later-described wire attachment part 30 of the slider 10 to which one end 4*a* of the corrugate tube 4 is attached. Hereinafter, the space 76*b* is referred to as a "wire receiving part 76*b*".

According to the present invention, because the wire receiving part 76*b* and the slit 75 are displaced relative to each other along the width direction of the supporting rail 7, a foreign particle invading the supporting rail 7 via the slit 75 is prevented from interrupting the movement of the slider 10 by sticking in the wire receiving part 76*b*. Further, even if the foreign particle such as a branch invades the supporting rail 7 via the slit 75, the foreign particle is prevented from contacting the corrugate tube 4 or the wire attachment part 30, so that the corrugate tube 4 and the wire attachment part 30 are prevented from being damaged.

Figure 2:
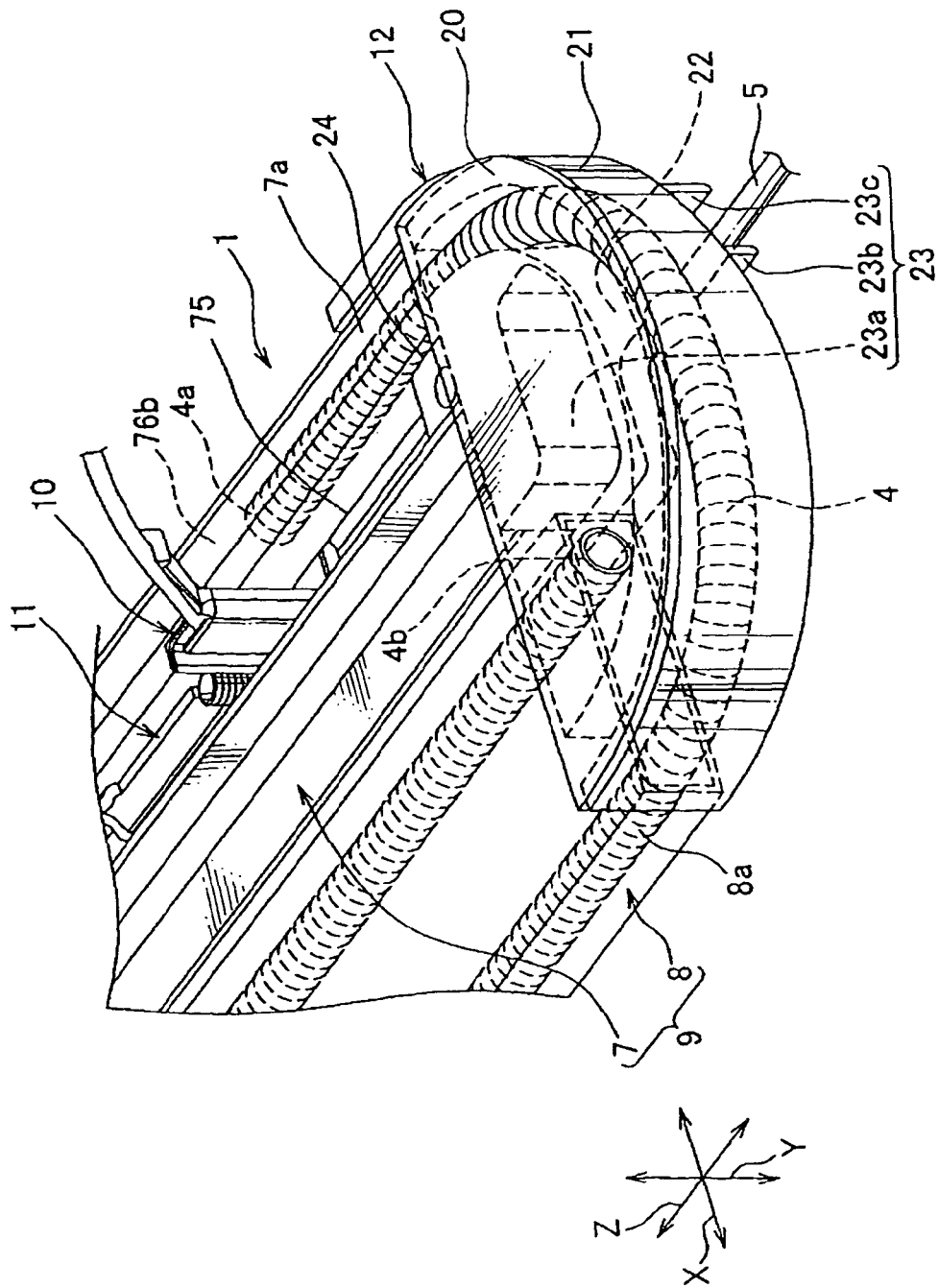
[FIG. 2] A partially enlarged view showing the sliding device shown in FIG. 1.

In this embodiment, the receiving part 8 is made of metal, formed in a rectangular tubular shape having the same cross section extended from one end 8*a* in the longitudinal direction (arrow Z direction) to the other end 8*b*, and arranged parallel to the supporting rail 7. Namely, the supporting rail 7 and the receiving part 8 are arranged along the width direction (arrow X direction) of the supporting rail 7. The one end 8*a* in the longitudinal direction (arrow Z direction) of the receiving part 8 is adjacent to the one end 7*a* of the supporting rail 7. Further, as shown in FIG. 2, the receiving part 8 receives the extra length of the corrugate tube 4, namely, the electric wire 5 folded back in a U-shape.

According to the present invention, because the corrugate tube 4 folded back in a U-shape is received in the receiving part 8, a size in the width direction (arrow X direction) of the receiving part 8, namely, a size in the width direction of the rail 9 can be reduced. Further, a size in the longitudinal direction (arrow Z direction) of the receiving part 8 can be smaller than a sliding area of the supporting body 11, namely, a size in the longitudinal direction (arrow Z direction) of the supporting rail 7. Namely, the sliding device 1 can be compact.

Figure 11:
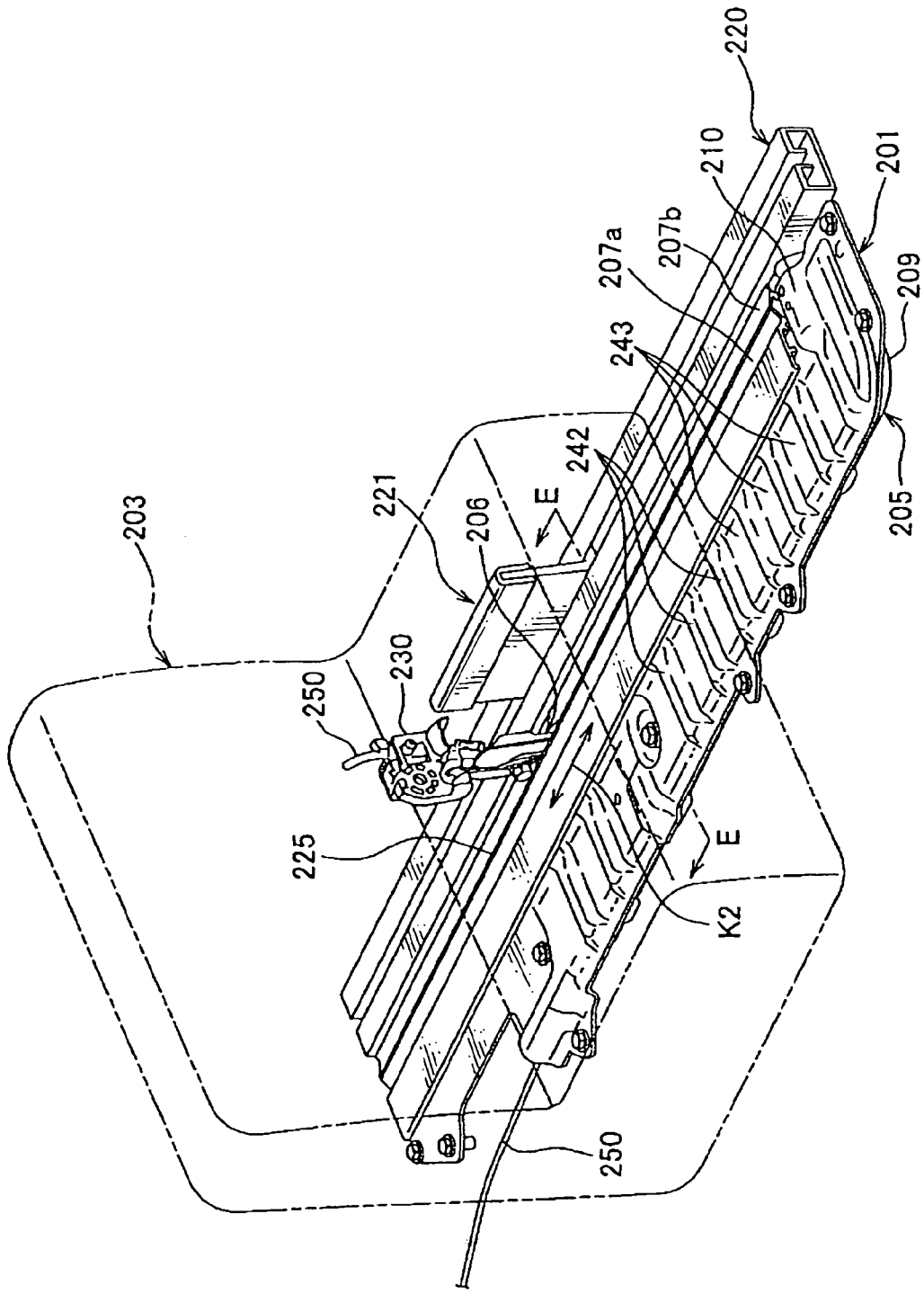
[FIG. 11] A perspective view showing a conventional sliding device.
Figure 12:
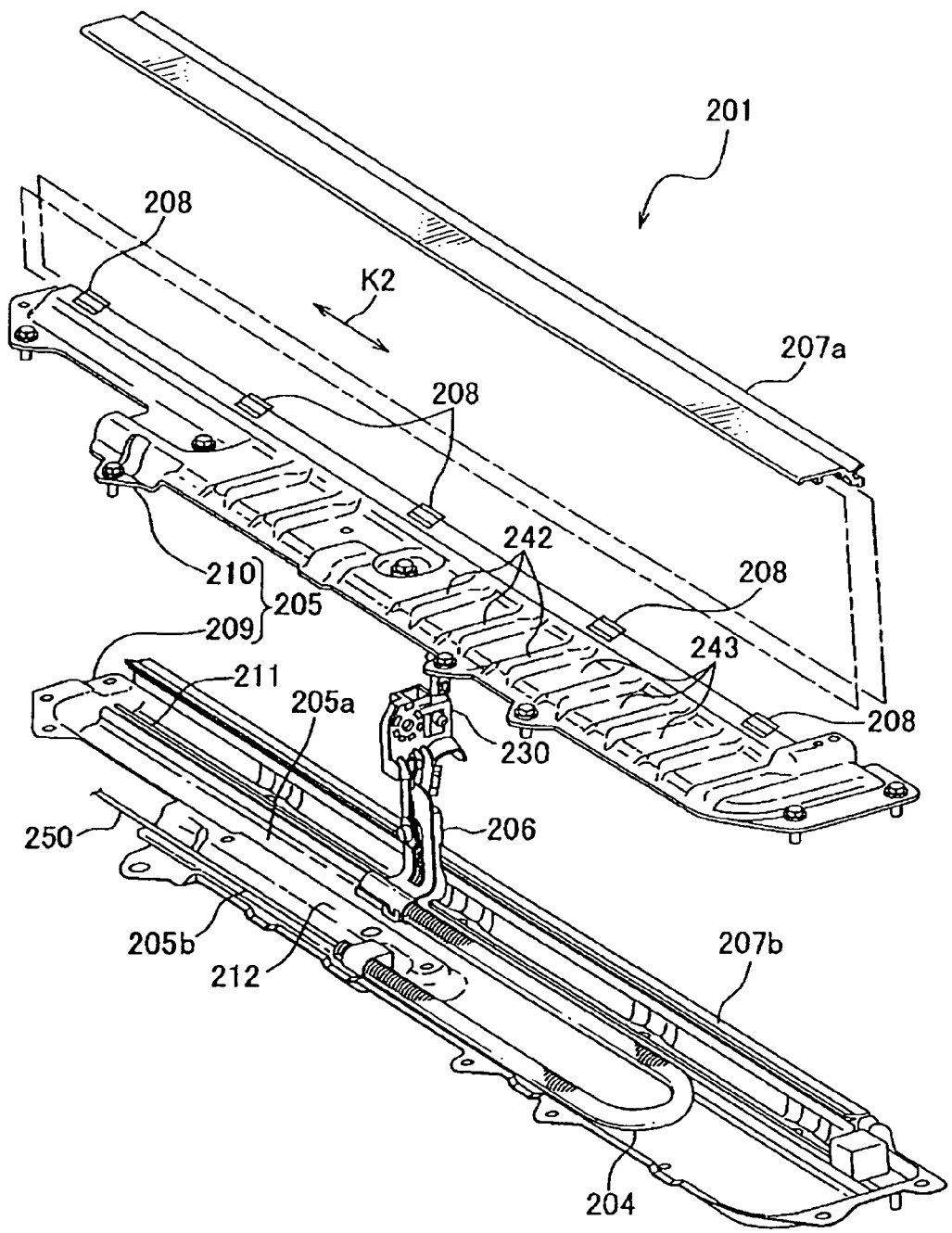
[FIG. 12] An exploded view showing the conventional sliding device shown in FIG. 11.

Further, according to this embodiment, because the supporting rail 7 and the receiving part 8 are separated from each other, rigidity of each of the supporting rail 7 and the receiving part 8 can be increased, thereby the strength of the rail 9 can be increased. Therefore, it becomes unnecessary to provide a concave or a convex (see FIGS. 11 and 12) which are conventionally provided for increasing the strength on the supporting rail 7 or the receiving part 8. Accordingly, shapes of the supporting rail 7 and the receiving part 8 can be simplified. Further, because the supporting rail 7 and the receiving part 8 are separated from each other, and the cross-sectional shape in the longitudinal direction is constant, they can be made by extrusion molding or roll forming having low process cost. Further, according to this embodiment, the supporting rail 7 and the receiving part 8 are made of metal, however, the present invention is not limited to this. For example, the supporting rail 7 and the receiving part 8 may be made of synthetic resin. Namely, the supporting rail 7 and the receiving part 8 of the present invention may be made by any material as long as it can be prevented from being deformed and damaged when a crew of a vehicle treads upon it.

The corrugate tube 4 is made of synthetic resin such as polypropylene, and formed in a cylindrical bellows shape having alternately crests and troughs arranged in an axial direction so as to be bending deformable, namely, elastically deformable. This corrugate tube 4 protects the electric wire 5 by inserting the electric wire 5 thereinto. According to the present invention, the electric wire 5 may be single or multiple.

The slider 10 is made of synthetic resin, and as shown in FIGS. 5 to 9, includes: the wire attachment part 30 to which the one end 4a of the corrugate tube 4 receiving the electric wire 5 is attached; a main body part 40 for guiding the electric wire 5 extracted out from the one end 4a of the corrugate tube 4 to the seat 3 via the supporting rail 7 and the slit 75; and a supporting body attachment part 50 to be attached to the supporting body 11.

The wire attachment part 30 includes: a pair of clipping parts 31, 34 extended along the longitudinal direction of the supporting rail 7 for clipping the one end 4a of the corrugate tube 4 up and down; and a hinge part 33 connecting the pair of clipping parts 31, 34 to each other.

Figure 7:
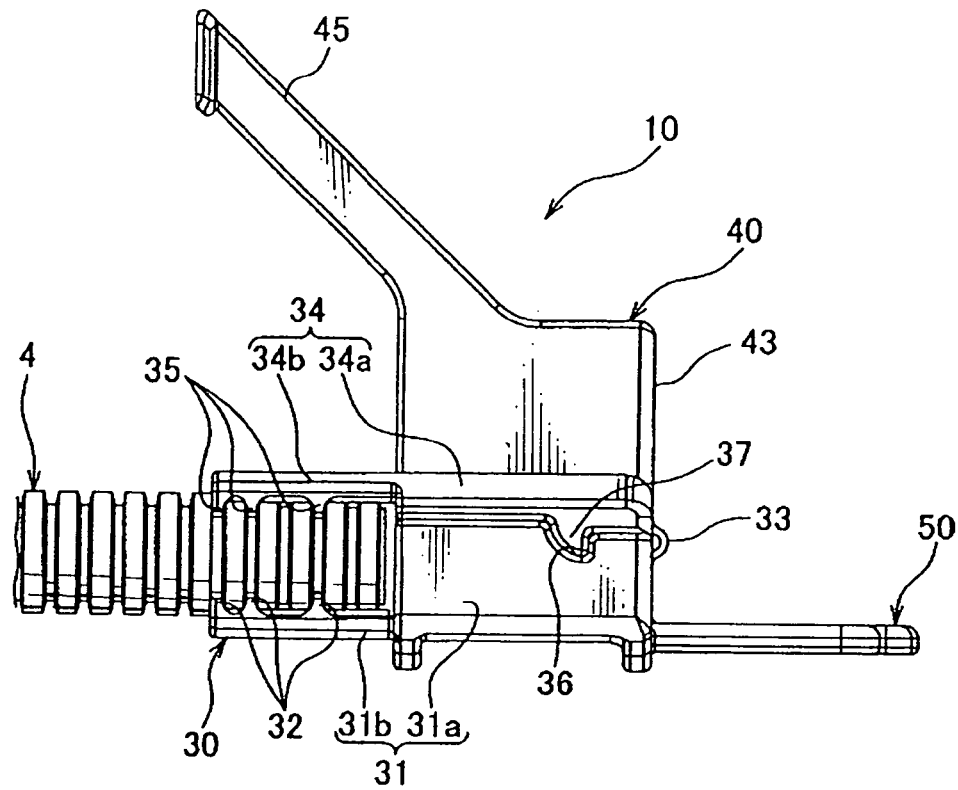
[FIG. 7] A plan view showing a back surface of the slider shown in FIG. 6.
Figure 8:
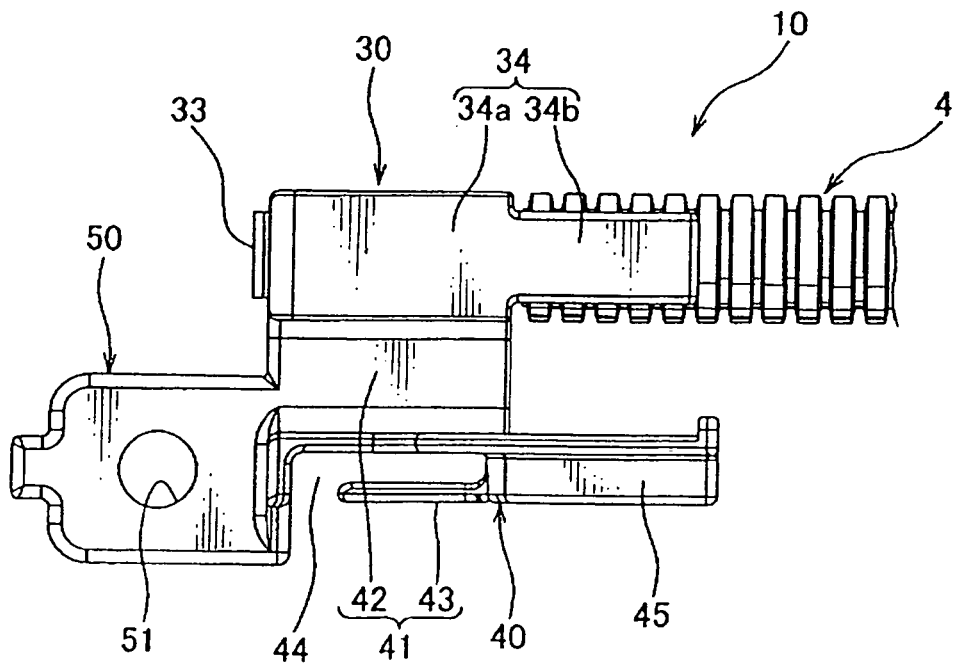
[FIG. 8] A plan view showing an upper surface of the slider shown in FIG. 6.

One clipping part 31 includes: a semi-cylindrical base part 31a; and a clipping piece 31b extended in the longitudinal direction of the supporting rail 7 from the base part 31a and overlapped with a lower part of the one end 4a of the corrugate tube 4. As shown in FIG. 7, a lock receiving part 36 for locking a later-described locking claw 37 is formed on the base part 31a. A plurality of ribs 32 for breaking into the troughs of the corrugate tube 4, namely, between the crests is formed on the clipping piece 31b.

The other clipping part 34 includes: a cover part 34a overlapped with the base part 31a, and composing a tubular shape with the base part 31a; and a clipping piece 34b extended in the longitudinal direction of the supporting rail 7 from the cover part 34a, and overlapped with an upper part of the one end 4a of the corrugate tube 4. As shown in FIG. 7, the locking claw 37 for locking with the lock receiving part 36 is formed on the cover part 34a. When the locking claw 37 is locked with the lock receiving part 36, the pair of clipping parts 31, 34 keeps clipping the one end 4a of the corrugate tube 4 therebetween. A plurality of ribs 35 for breaking into the troughs of the corrugate tube 4, namely, between the crests is formed on the clipping piece 34b.

Such a wire attachment part 30 is slidably received in the wire receiving part 76b. According to the present invention, because the wire attachment part 30 and the corrugate tube 4 are received in the space 76b receiving the extended part 14b of the supporting body 11, namely, the wire receiving part 76b, the structure of the supporting rail 7 can be compact and simple.

Further, the corrugate tube 4 is clipped between the pair of clipping pieces 34a, 34b in a manner that an axial direction of the corrugate tube 4 is parallel to the longitudinal direction of the supporting rail 7. Thereby, the corrugate tube 4 is prevented from scraping with an inner wall of the supporting rail 7 by hanging down due to its own weight. Further, when a plurality of ribs 32, 35 break into the troughs of the corrugate tube 4, the corrugate tube 4 is prevented from falling out from between the pair of clipping pieces 34a, 34b.

The main body part 40 includes: a tube part 41 formed in an L-shape tube with a first tube part 42 extended in a tubular shape along the width direction of the supporting rail 7 from the base part 31a, and a second tube part 43 extended upward in a tubular shape from an end of the first tube part 42 away from the base part 31a; and a guiding part 45 extended in a plate shape from an upper end of the second tube part 43. As shown in FIG. 9, the second tube part 43 includes the slit 75, and an upper end of the second tube part 43 is positioned outside of the supporting rail 7. When the electric wire 5 extracted out from the one end 4a of the corrugate tube 4 and guided into the space between the base part 31a and the cover part 34a is inserted into the tube part 41, the electric wire 5 is guided from the supporting rail 7 via the slit 75 toward the seat 3. Further, a slit 44 cutting out the tube part 41 in a straight shape between an end of the first tube part 42 near the base part 31a and an upper end of the second tube part 43 is provided on the tube part 41. Further, as shown in FIG. 5, when the guiding part 45 follows the electric wire 5 extracted out of the tube part 41, the guiding part 45 guides the electric wire 5 to the seat 3.

Namely, in the main body part 40, the electric wire 5 is inserted into the tube part 41, and an upper part of the main body part 40 is projected toward the cabin via the slit 75 of the supporting rail 7 and a cut line 15a of the mat 15 so as to guide the electric wire 5 to the seat 3 disposed on the cabin.

The supporting body attachment part 50 is configured to be extended in a plate shape from an outer surface of the tube part 41, and to have a round hole 51 in the center thereof. This supporting body attachment part 50 is overlapped with the sliding part 14 of the supporting body 11, a bolt 18 is inserted into the round hole 51, and a nut 19 is screwed with the bolt 18, thereby the supporting body attachment part 50 is attached to (connected to) the supporting body 11.

Because the supporting body attachment part 50 is connected to the supporting body 11, the slider 10 slides in the supporting rail 7 in conjunction with the supporting body 11, namely, the seat 3. Further, as shown in FIG. 9, the slider 10 is attached to the supporting body 11 in a manner that the slider 10 does not contact an inner surface of the supporting rail 7. Further, the slider 10 is positioned further front side of the vehicle than the supporting body 11.

According to the present invention, because the slider 10 is slidably attached to the supporting rail 7 to which the supporting body 11 is slidably attached, it is unnecessary to provide a special rail to which the slider 10 is slidably attached. Therefore, the number of cut lines 15a provided on the mat 15 can be reduced. Further, the sliding device 1 can be compact and simple.

Further, according to the present invention, because the slider 10 is attached to the supporting body 11 in a manner that the slider 10 does not contact an inner surface of the supporting rail 7, the slider 10 and the supporting rail 7 are prevented from scraping each other, and the supporting body 11 and the slider 10 are moved smoothly.

Further, when a crew of the vehicle slides the seat 3, normally, a force for sliding the seat 3 forward is weaker than a force for sliding the seat 3 backward. Therefore, according to the present invention, because the slider 10 is positioned further front side of the vehicle than the supporting body 11, the slider 10 is prevented from being severely hit by a later-described guiding member 12 attached to the one end 7a of the supporting rail 7, and damaged.

Figure 3:
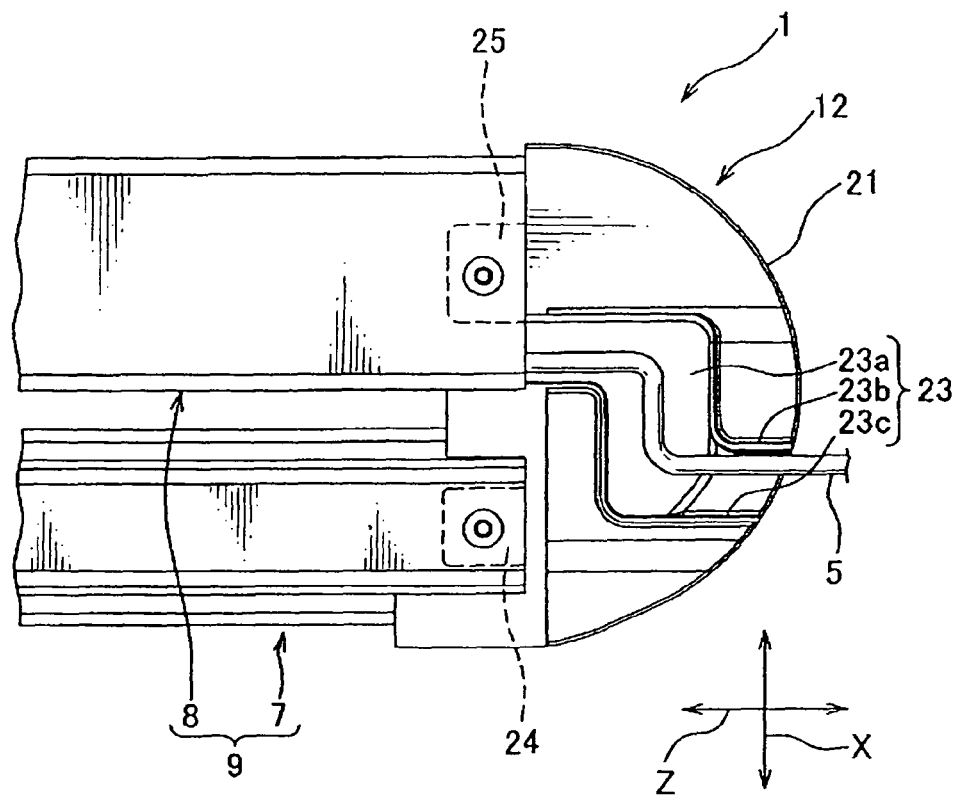
[FIG. 3] A plan view showing a rear side of the sliding device shown in FIG. 2.
Figure 4:
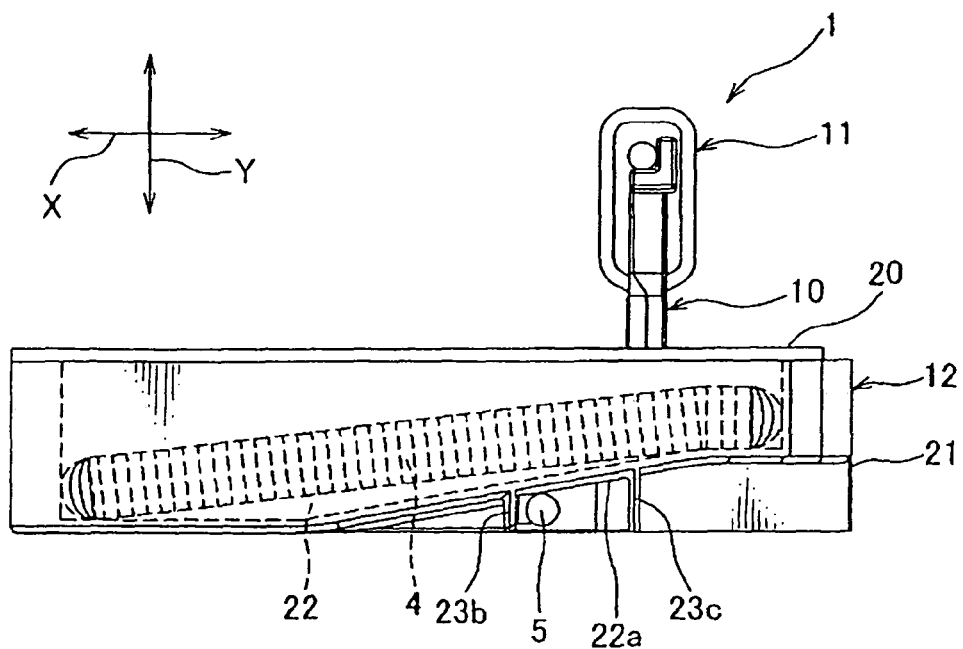
[FIG. 4] A side view showing the sliding device shown in FIG. 2.

The guiding member 12 is made of synthetic resin, and as shown in FIGS. 2 to 4, includes a substantially semi-cylindrical guiding member main body 21; and a plate 20 attached to an upper wall of the guiding member main body 21. The guiding member main body 21 includes: a first fixing part 24 fixed to the one end 7a of the supporting rail 7; a second fixing part 25 fixed to the one end 8a of the receiving part 8; and a guiding part 22 for bending the corrugate tube 4 extracted out from the one end 7a of the supporting rail 7 in a U-shape, and guiding the corrugate tube 4 to an inside of the one end 8a of the receiving part 8 near the one end 7a of the supporting rail 7, and for guiding the corrugate tube 4 so that the corrugate tube 4 contacts an inner side wall 81 of the receiving part 8 away from the supporting rail 7.

The guiding part 22 is a semi-circular, namely, U-shaped groove in a plan view on an upper wall of the guiding member main body 21. When the corrugate tube 4 is received in the guiding part 22, the corrugate tube 4 is bent in a U-shape, and guided to the receiving part 8. Further, a base 22a of the guiding part 22 is sloped so that the base 22a is separated away from the floor 2 as the base 22a is extended from the receiving part 8 toward the supporting rail 7, and a portion of the base 22a near the supporting rail 7 is separated with a gap from the floor 2.

Further, the corrugate tube 4 drawn into the one end 8a of the receiving part 8 by the guiding part 22 is further folded back in a U-shape, and the folded portion contacts an inner side wall 82 of the receiving part 8 near the supporting rail 7 owing to elastic restoring force of the corrugate tube 4. Namely, the corrugate tube 4 is expanded in the receiving part 8 owing to the elastic restoring force generated by being bent twice in the same curving direction, and sticks to the inner side walls 81, 82.

Further, in the guiding member 12, an extracting part 23 is provided on the guiding member main body 21 for intersecting the electric wire extracted from the corrugate tube 4 which is further folded back in the receiving part 8 at a different height from the guiding part 22 to extract the electric wire 5 from the receiving part 8. In this embodiment, the extracting part 23 is composed of a hole 22a connecting an inside of the one end 8a of the receiving part 8 with a space positioned at a lower part on the base 22a near the supporting rail 7, and a pair of standing walls 23b, 23c extended vertically from the base 22a near the supporting rail 7 toward the floor 2. The other end 4b of the corrugate tube 4 further folded back in the receiving part 8 is positioned on the one end 8a of the receiving part 8. The electric wire 5 extracted out from the receiving part 8 is passed through the hole 23a and through between the pair of standing walls 23b, 23c, passed under the guiding part 22, and extracted out of the receiving part 8. As described above, the electric wire 5 extracted out of the receiving part 8 is connected to an electronic device such as ECU (Electronic Control Unit) attached to a vehicle body.

According to the present invention, the guiding member 12 having the guiding part 22 for bending the corrugate tube 4 extracted from the supporting rail 7 in a U-shape and guiding the corrugate tube 4 to the receiving part 8, and for guiding the corrugate tube 4 in a manner that the corrugate tube 4 contacts the inner side wall 81 of the receiving part 8 away from the supporting rail 7 is provided. Further, the corrugate tube 4 further folded back in a U-shape in the receiving part 8 in the same curving direction as the curving direction in the guiding part 22 is provided. Therefore, the corrugate tube 4 is expanded in the receiving part 8 and sticks to the inner side walls 81, 82. Resultingly, the corrugate tube 4 is prevented from scraping when guiding in or out from the receiving part 8 even without providing a conventional guiding member such as the regulating part (see FIG. 12) or a pulley in the receiving part 8, and the corrugate tube 4 is moved smoothly. Further, the corrugate tube 4 positioned outside of the rail 9 is prevented from being damaged. Therefore, the receiving part 8 can be in a simple tubular shape, and the compact sliding device 1 having a simple structure can be provided. Incidentally, in the present invention, "the curving direction is the same" means that an object curved at a plurality of points is totally curved in the spiral direction.

Further, according to the present invention, the guiding part 22 guides the corrugate tube 4 extracted out from the supporting rail 7 in a manner that the corrugate tube 4 contacts the inner side wall 81 of the receiving part 8 away from the supporting rail 7. Therefore, a route of the corrugate tube 4 becomes a big detour, namely, a curving radius becomes large, so that the corrugate tube 4 can be moved smoothly, and the corrugate tube 4 is prevented from having a heavy curving tendency. Further, because the corrugate tube 4 is folded back in a U-shape in the receiving part 8 in the same curving direction as the curving direction of the guiding part 22, the corrugate tube 4 is prevented from having a curving tendency in an S-shape.

Further, according to the present invention, the extracting part 23 is provided on the guiding member 12 for intersecting the electric wire 5 extracted from the other end 4b of the corrugate tube 4 which is further folded back in the receiving part 8 at a different height from the guiding part 22 to extract the electric wire 5 from the receiving part 8. Therefore, when the corrugate tube 4 is guided in or out from the receiving part 8, crossing parts of the corrugate tube 4 or the electric wire 5 is prevented from scraping each other. Further, according to the present invention, the corrugate tube 4 may be extended further from the other end 4b, and the extended part may be inserted into the extracting part 23.

The pair of malls 16 is attached to outer surfaces of the pair of upper walls 73. The pair of malls 16 covers the slit 75 so as to prevent a foreign particle such as dust from entering the supporting rail 7 via the slit 75.

Next, an operation of the sliding device 1 will be explained with reference to FIGS. 10A, 10B. As shown in FIG. 10A, when the supporting body 11, namely, the seat 3 is positioned at the one end 7a of the supporting rail 7, the extra length of the corrugate tube 4, namely, the electric wire 5 is received in the receiving part 8. Then, as shown in FIG. 10B, as the supporting body 11, namely, the seat 3 slides from the one end 7a to the other end 7b of the supporting rail 7, the slider 10 slides from the one end 7a to the other end 7b of the supporting rail 7 in conjunction with the supporting body 11, so that the extra length of the corrugate tube 4, namely, the electric wire 5 is extracted out from the one end 8a of the receiving part 8 and drawn into an inside of the one end 7a of the supporting rail 7.

Further, in this embodiment, the supporting rail 7 and the receiving part 8 are separated from each other. However, according to the present invention, the supporting rail 7 and the receiving part 8 may be integrally formed with each other.

Further, in this embodiment, "the holding part" is the slider 10 connected to the supporting body 11. However, according to the present invention, "the holding part" may be attached to the seat 3. Further, "the holding part" may be a part of the supporting body 11 or the seat 3.

Further, in this embodiment, "the tube" is the corrugate tube 4. However, according to the present invention, "the tube" may be a tube having an elastically restoring force for returning to a straight shape when a curving force is applied to the tube.

According to the embodiment described above, a sliding device described below is attained.

(Note 1)

A sliding device 1 for routing an electric wire 5 between a vehicle body 2 and a sliding body 3 supported by a supporting body 11 slidably attached to a long tubular supporting rail 7 fixed to the vehicle body 2, said sliding device comprising:

a slider 10 for sliding in conjunction with the supporting body 11 and having a supporting body attachment part 50 attached to the supporting body 11, a wire attachment part 30 to which the electric wire 5 drawn into an inside of the supporting rail 7 from one end 7a of the supporting rail 7 is attached, and a main body part 40 for extracting the electric wire 5 to the outside of the supporting rail 7 via a slit 75 formed between the one end 7a to the other end 7b of the supporting rail 7, and for guiding the electric wire 5 to the sliding body 3; and a receiving part 8 for receiving an extra length of the electric wire 5 extracted to the outside of the supporting rail 7 from the one end 7a of the supporting rail 7.

(Note 2)

The sliding device 1 as described in the Note 1, wherein the slider 10 is attached to the supporting body 11 in a manner that the slider 10 does not contact the supporting rail 7.

(Note 3)

The sliding device 1 as described in the Note 1 or 2, wherein the wire attachment part 30 includes: a pair of clipping parts 31, 34 extended along a longitudinal direction of the supporting rail 7 for clipping the electric wire 5 up and down.

(Note 4)

The sliding device 1 as described in any one of the Notes 1 to 3, wherein a wire receiving part 76b extended in the longitudinal direction of the supporting rail 7, and receiving the electric wire 5 drawn into the inside of the supporting rail 7 and the wire attachment part 30 is provided on the supporting rail 7, and wherein the wire receiving part 76b and the slit 75 are displaced relative to each other along a width direction of the supporting rail 7.

(Note 5)

The sliding device 1 as described in any one of the notes 1 to 4, wherein the slider 10 is positioned further front side of a vehicle than the supporting body 11 configured to support the seat 3 as the sliding body.

According to the note 1, the sliding device 1 includes: a slider 10 for sliding in conjunction with the supporting body 11 and having a supporting body attachment part 50 attached to the supporting body 11, a wire attachment part 30 to which the electric wire 5 drawn into an inside of the supporting rail 7 from one end 7a of the supporting rail 7 is attached, and a main body part 40 for extracting the electric wire 5 to the outside of the supporting rail 7 via a slit 75 formed between the one end 7a to the other end 7b of the supporting rail 7, and for guiding the electric wire 5 to the sliding body 3; and a receiving part 8 for receiving an extra length of the electric wire 5 extracted to the outside of the supporting rail 7 from the one end 7a of the supporting rail 7. Therefore, it is unnecessary to provide a special rail to which the slider 10 is slidably attached. Further, when the sliding device 1 is disposed under the mat 15 mounted on a cabin of a vehicle, the electric wire 5 can be inserted into the cut line 15a formed on the mat 15 for projecting the supporting body 11 toward the cabin. Therefore, the number of the cut lines 15a formed on the mat 15 mounted on a cabin of a vehicle can be reduced, and a compact sliding device 1 having a simple structure can be provided.

According to the note 2, because the slider 10 is attached to the supporting body 11 in a manner that the slider 10 does not contact the supporting rail 7, the slider 10 and the supporting rail 7 are prevented from scraping each other, and the supporting body 11 and the slider 10 are moved smoothly.

According to the note 3, the wire attachment part 30 includes: a pair of clipping parts 31, 34 extended along a longitudinal direction of the supporting rail 7 for clipping the electric wire 5 up and down. Therefore, the electric wire 5 is prevented from scraping with the supporting rail 7 by hanging down due to its own weight.

According to the note 4, a wire receiving part 76b extended in the longitudinal direction of the supporting rail 7, and receiving the electric wire 5 drawn into the inside of the supporting rail 7 and the wire attachment part 30 is provided on the supporting rail 7, and the wire receiving part 76b and the slit 75 are displaced relative to each other along a width direction of the supporting rail 7. Therefore, a foreign particle invading the supporting rail 7 via the slit 75 is prevented from interrupting the movement of the slider 10 by sticking in the wire receiving part 76b. Further, even if the foreign particle such as a branch invades the supporting rail 7 via the slit 75, the foreign particle is prevented from contacting the 5electric wire 5 or the wire attachment part 30, so that the electric wire 5 and the wire attachment part 30 are prevented from being damaged.

According to the note 5, when a crew of the vehicle slides the seat 3, normally, a force for sliding the seat 3 forward is weaker than a force for sliding the seat 3 backward. Therefore, because the slider 10 is positioned further front side of the vehicle than the supporting body 11, the slider 10 is prevented from being severely hit by the one end 7a of the supporting rail 7, and damaged.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

REFERENCE SIGNS LIST 1 sliding device
2 floor (vehicle body)
3 seat (sliding body)
4 corrugate tube (tube)
5 electric wire
7 supporting rail
8 receiving part
10 slider (holding part)
11 supporting body
12 guiding member
22 guiding part
23 extracting part
30 wire attachment part
40 main body part
50 supporting body attachment part
75 slit
81, 82 inner side wall

The invention claimed is:

1. A sliding device for routing an electric wire between a vehicle body and a sliding body supported by a supporting body slidably attached to a long tubular supporting rail fixed to the vehicle body, said sliding device comprising:

a tubular receiving part extended along a longitudinal direction of the supporting rail and parallel to the supporting rail, and fixed to the vehicle body for receiving an extra length of the electric wire;

a tube made of an elastically deformable material for receiving the electric wire;

a holding part that slides in conjunction with the supporting body while holding the tube drawn into an inside of the supporting rail from one end of the supporting rail; and a guiding member on which a guiding part is provided for bending the tube extracted out from one end of the supporting rail in a U-shape, wherein both ends of the U-shaped bend are at different heights, and guiding the tube into an inside at one end of the receiving part, and for guiding the tube onto an inner side wall of the receiving part away from the supporting rail, wherein the tube is further bent in a U-shape in the receiving part and received in the receiving part, wherein an extracting part is provided on the guiding member for intersecting the electric wire extracted from the tube which is further folded back in the receiving part at a different height from the guiding part to extract the electric wire from the receiving part, and wherein the extracting part comprises: a hole connecting an inside of one end of the receiving part with a space positioned at a lower part on a base near the supporting rail; and a pair of standing walls extended vertically from the base toward the vehicle body.

2. The sliding device as claimed in claim 1,
wherein the supporting rail and the receiving part are separated from each other.

3. The sliding device as claimed in claim 1,
wherein the holding part includes: a supporting body attachment part attached to the supporting body; a wire attachment part to which the tube extracted to an inside of the supporting rail from one end of the supporting rail is attached; and a main body that extracts the electric wire extracted from the tube via the slit provided between one end to the other end of the supporting rail to an outside of the supporting rail and to guide the electric wire to the sliding body.

4. The sliding device as claimed in claim 1,
wherein the holding part is attached to the supporting body in a manner that the holding part does not contact the supporting rail.

5. The sliding device as claimed in claim 2,
wherein the holding part includes: a supporting body attachment part attached to the supporting body; a wire attachment part to which the tube extracted to an inside of the supporting rail from one end of the supporting rail is attached; and a main body that extracts the electric wire extracted from the tube via the slit provided between one end to the other end of the supporting rail to an outside of the supporting rail and to guide the electric wire to the sliding body.

6. The sliding device as claimed in claim 2,
wherein the holding part is attached to the supporting body in a manner that the holding part does not contact the supporting rail.

7. The sliding device as claimed in claim 3,
wherein the holding part is attached to the supporting body in a manner that the holding part does not contact the supporting rail.

8. The sliding device as claimed in claim 5,
wherein the holding part is attached to the supporting body in a manner that the holding part does not contact the supporting rail.

9. The sliding device as claimed in claim 1,
wherein the electric wire extracted out from the receiving part is passed through the hole and through between the pair of standing walls, passed under the guiding part, and extracted out of the receiving part.

* * * * *